US007769970B1

(12) United States Patent
Yeh et al.

(10) Patent No.: US 7,769,970 B1
(45) Date of Patent: *Aug. 3, 2010

(54) UNIFIED MEMORY CONTROLLER

(75) Inventors: Gerard Yeh, Redwood City, CA (US);
Ravi Manyam, Santa Clara, CA (US);
Viet Nguyen, Mountain View, CA (US)

(73) Assignee: Zoran Corporation, Sunnyvale, CA (US)

( * ) Notice: Subject to any disclaimer, the term of this patent is extended or adjusted under 35 U.S.C. 154(b) by 435 days.

This patent is subject to a terminal disclaimer.

(21) Appl. No.: 11/780,381

(22) Filed: Jul. 19, 2007

Related U.S. Application Data

(63) Continuation of application No. 10/877,661, filed on Jun. 25, 2004, now Pat. No. 7,263,587.

(60) Provisional application No. 60/483,330, filed on Jun. 27, 2003.

(51) Int. Cl.
*G06F 12/00* (2006.01)
*G06F 13/00* (2006.01)

(52) U.S. Cl. .................. 711/158; 711/100; 711/154; 711/160; 711/202

(58) Field of Classification Search ................. 711/100, 711/154, 158, 160, 202
See application file for complete search history.

(56) References Cited

U.S. PATENT DOCUMENTS

| | | | |
|---|---|---|---|
| 6,526,583 B1 * | 2/2003 | Auld et al. ................. 725/139 |
| 6,793,625 B2 | 9/2004 | Cavallaro et al. |
| 6,795,875 B2 | 9/2004 | Gray et al. |
| 7,051,172 B2 | 5/2006 | Mastronarde et al. |
| 7,061,929 B1 | 6/2006 | Eberle et al. |
| 2004/0090441 A1 | 5/2004 | Su et al. |
| 2004/0244011 A1 | 12/2004 | Morris et al. |
| 2006/0179225 A1 | 8/2006 | Wester et al. |

* cited by examiner

*Primary Examiner*—Tuan V. Thai
(74) *Attorney, Agent, or Firm*—Frommer Lawrence & Haug LLP; John W. Branch

(57) ABSTRACT

A unified memory controller (UMC) is disclosed. The UMC may be used in a digital television (DTV) receiver. The UMC allows the DTV receiver to use a unified memory. The UMC accepts memory requests from various clients, and determines which requests should receive priority access to the unified memory.

21 Claims, 15 Drawing Sheets

(PRIOR ART)

600

| A 602 | B 604 |
|---|---|
| C 606 | D 608 |

610

| D 612 | C 614 |
|---|---|
| B 616 | A 618 |

620

630

640

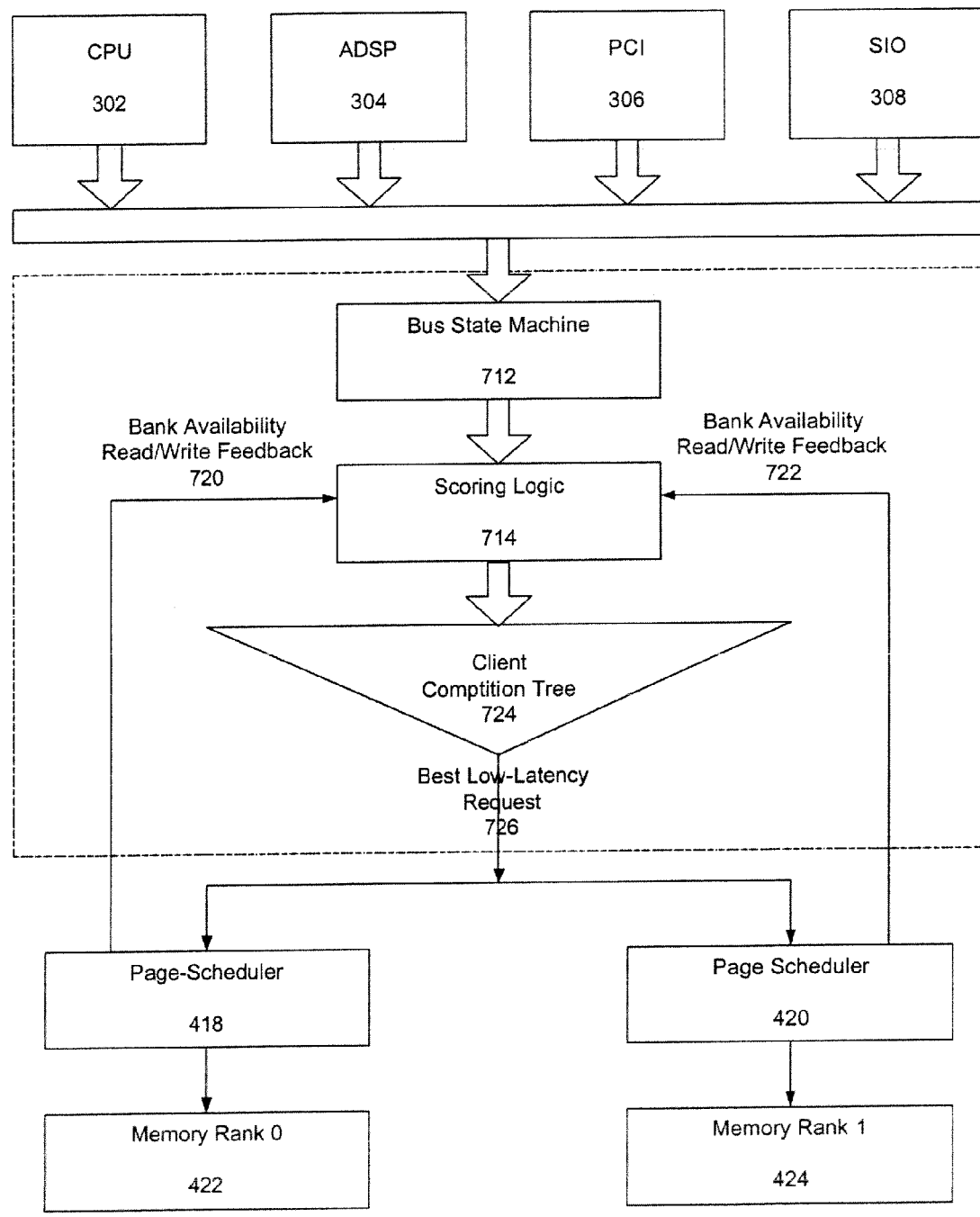

Figure 7B

| Aging | Read/Write Cycle | Bank Availability | User Programmable Client Priority |
|---|---|---|---|
| 752 | 754 | 756 | 758 |

750

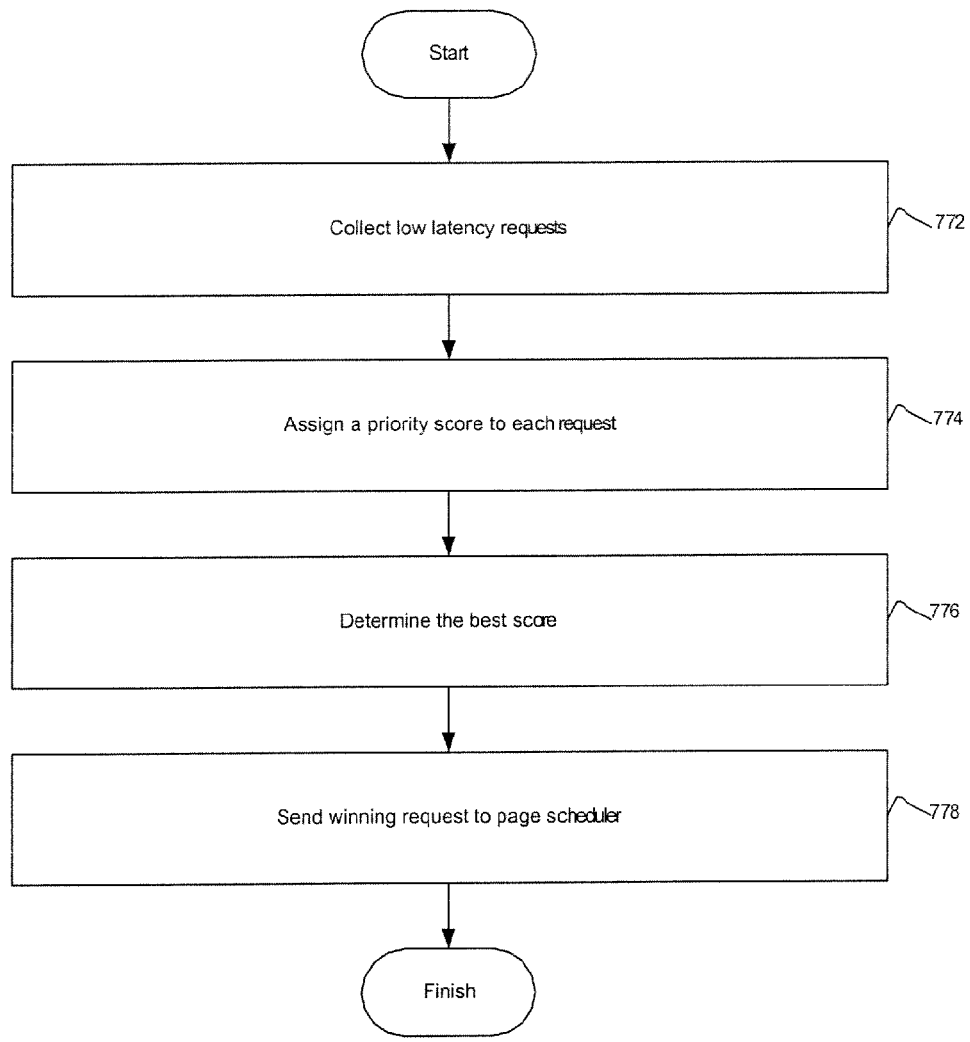

414

UNIFIED MEMORY CONTROLLER

RELATED APPLICATION

This application is a continuation of U.S. patent application Ser. No. 10/877,661, filed on Jun. 25, 2004, which claims the benefit of U.S. provisional patent application No. 60/483,330, filed on Jun. 27, 2003.

FIELD OF THE INVENTION

The present invention relates to memory devices in general, and specifically a memory controller for a digital television system.

BACKGROUND OF THE INVENTION

A digital television (DTV) receiver can receive DTV signals, process them and display them on an analog or digital monitor, allow for interactivity, and act as a personal video recorder (PVR). A DTV receiver may be embodied in a set top box (STB), or may be integrated with a television. DTV receivers generally use several processors, memories, and other electronic components. These components process the digital signals, store information, allow user interaction with the DTV set, and output the video and audio. These systems are becoming increasingly complex and expensive as more functionality is added to DTV receivers.

FIG. 1 illustrates a prior art digital television controller system. The DTV system 100 comprises several components. The central processing unit (CPU) 102 controls the system 100. A tuner 104 receives an analog or digital (DTV) signal. A digital signal may be a high definition (HD) or other signal. The output of the tuner 104 is sent to a National Television Standards Committee (NTSC) decoder 106. The NTSC decoder 106 decodes the television signal received by the tuner 104 and sends the signal to an advanced universal DTV decoder 112, which outputs an analog TV signal suitable for display on an analog television monitor. The DTV decoder 112 outputs a signal to an analog chassis 114, which displays a TV image on a cathode ray tube (CRT) or other display device 116. The DTV decoder 112 also sends output to an audio digital to analog converter (DAC) 118, which outputs the TV audio to speakers. A panel driver 120 controls a panel 122, which allows for user interaction with the system. A synchronous dynamic random access memory (SDRAM) 124 is a memory for the DTV decoder 112.

The tuner 104 also outputs the DTV signal to a demodulator 110, which then outputs a demodulated signal to an STB/PVR controller 126. The STB/PVR controller 126 can control the functions of the STB and a PVR. The STB/PVR controller 126 has its own SDRAM memory 128. The STB/PVR controller 126 is also coupled with a hard disk 130, which can store video and audio for a PVR. A boot read only memory (ROM) 132 provides data used by the system 100 to start up. An audio decoder 134 decodes digital audio. The audio decoder 134 has its own SDRAM memory 136. As can be seen in FIG. 1, three separate memories are being used to store data for three different subsystems. Other, additional systems may also have their own separate memories. Having many separate memories increases the complexity and the cost of the system 100. Further, there may be times when, for example, the audio decoder 134 is not being used because there is no audio. During those times, the memory 136 dedicated to the audio decoder 134 will be unused even though it may be useful for other subsystems. Since all of the memory in the system 100 is not available to all of the subsystems that require memory, the memories will be underutilized, and the system will be less efficient than it could be. Sometimes, data in one memory has to be transferred to another memory in order to be processed or shared with the processor attached to the second memory, and the system is less efficient because of the extra transfer operations required to share data.

SUMMARY

A unified memory controller (UMC) is disclosed. The UMC may be used in a digital television (DTV) receiver. The UMC allows the DTV receiver to use a unified memory. The UMC accepts memory requests from various clients, and determines which requests should receive priority access to the unified memory.

BRIEF DESCRIPTION OF THE DRAWINGS

FIG. 7A illustrates a block diagram of one embodiment of a low-latency scheduler.

FIG. 7B illustrates a one embodiment of system for determining the binary score used by the scoring logic.

FIG. 7C is a flowchart describing one embodiment of process for determining a winning low-latency request.

DETAILED DESCRIPTION

Described herein is a unified memory controller. In the following description, numerous specific details are set forth. However, it is understood that embodiments may be practiced without these specific details. For example, well known equivalent circuits may be substituted in place of those described herein, and similarly, well known equivalent techniques may be substituted in place of those disclosed herein. In other instances, well known structures and techniques have not been shown in detail in order not to obscure the understanding of this description.

According to one embodiment, a Digital television (DTV) receiver may use a unified memory that can be shared by several components with different memory access requirements. The unified memory will ultimately be less costly and simpler than using several separate memories. According to one embodiment, a DTV receiver generally requires memory access by three different types of clients: low-latency clients, which require quick memory access while needing relatively little data; high-bandwidth real-time clients, which require less immediate access for large amounts of data, but still have a deadline for the memory accesses; and high-bandwidth batch clients, which require large amounts of data, but can wait for memory access. Low-latency clients include, for example, a CPU, which generally uses immediate memory access of a control program to keep other subsystems running. High-bandwidth real-time clients include video processors, which generally use a constant stream of data from the memory to prevent a break in video output. High-bandwidth batch clients may be, for example, graphics processors, which can generally wait until the memory is available.

In one embodiment, a unified memory controller (UMC) can control the unified memory. The UMC can arbitrate between the various clients requesting access to the unified memory. The UMC may use various schedulers to determine a priority order of the memory access requests. In one embodiment, the UMC may consider any of several factors to determine the priority of the various memory requests, including the source of the request, the urgency of the request, the availability of the requested memory bank, whether the memory is currently reading or writing, etc. The UMC allows for clients having diverse memory needs to share access to a unified memory.

Figure 1:
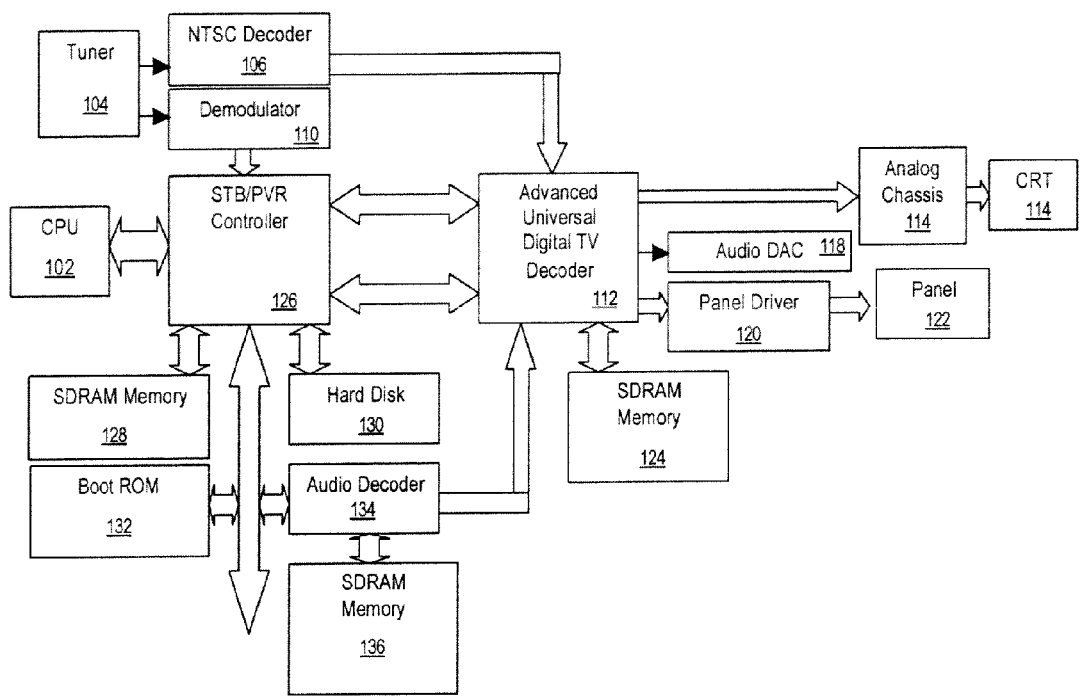
FIG. 1 illustrates a prior art digital television (DTV) controller system.
Figure 2:
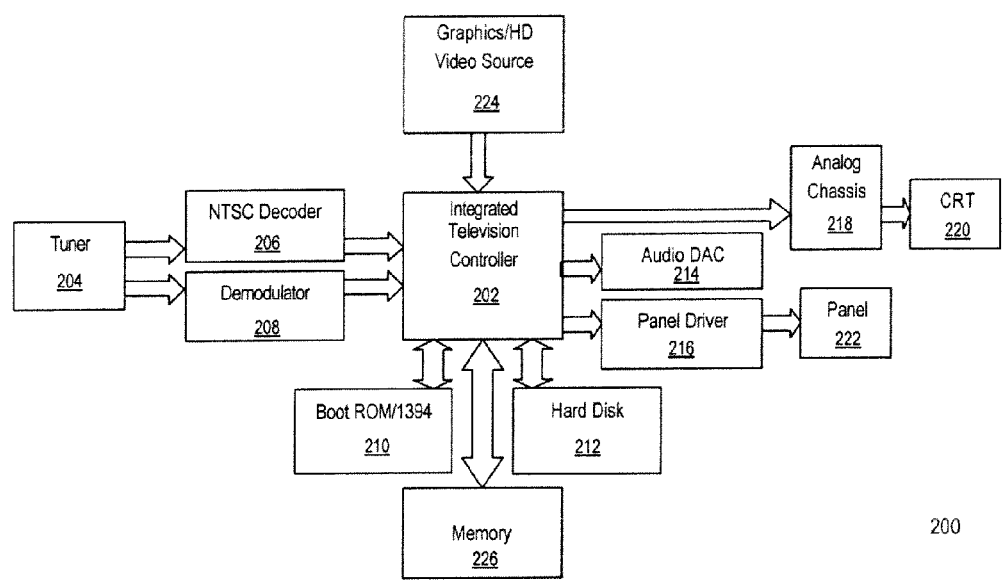
FIG. 2 illustrates one embodiment of an integrated digital television (DTV) system.

FIG. 2 illustrates one embodiment of an integrated digital television (DTV) system. According to this embodiment, the system 200 may be incorporated in a DTV set top box (STB) or an integrated DTV television. The system 200 includes, in one embodiment, an integrated television controller 202 that integrates the functions of a CPU, a STB/PVR (personal video recorder) controller, a DTV controller, and an audio controller on a single IC. The tuner 204, NTSC decoder 206, demodulator 208, boot ROM 210, hard disk 212, audio DAC 214, panel driver 216, analog chassis 218, CRT 220, and panel 222 are well known in the art and their functions and purpose need not be described in detail. The graphics/HD video source 224 supplies a high definition signal to the integrated television controller 202. It is further understood other components may be added, and that the components mentioned may be removed depending on the needs of the particular system.

According to an embodiment of the invention, the memory 226 is a unified memory for the entire system 200. In one embodiment, the memory 226 is a Synchronous Dynamic Random Access Memory (SDRAM) memory. The memory 226 may also comprise other types of memory, including Static RAM (SRAM), Dynamic RAM (DRAM), Double Data Rate RAM (DDR), etc. As mentioned above, by having a unified memory 226, the cost and the complexity of the system 200 is significantly reduced over prior implementations. Further, the memory 226 is better and more completely utilized than the earlier, separate memories.

Figure 3:
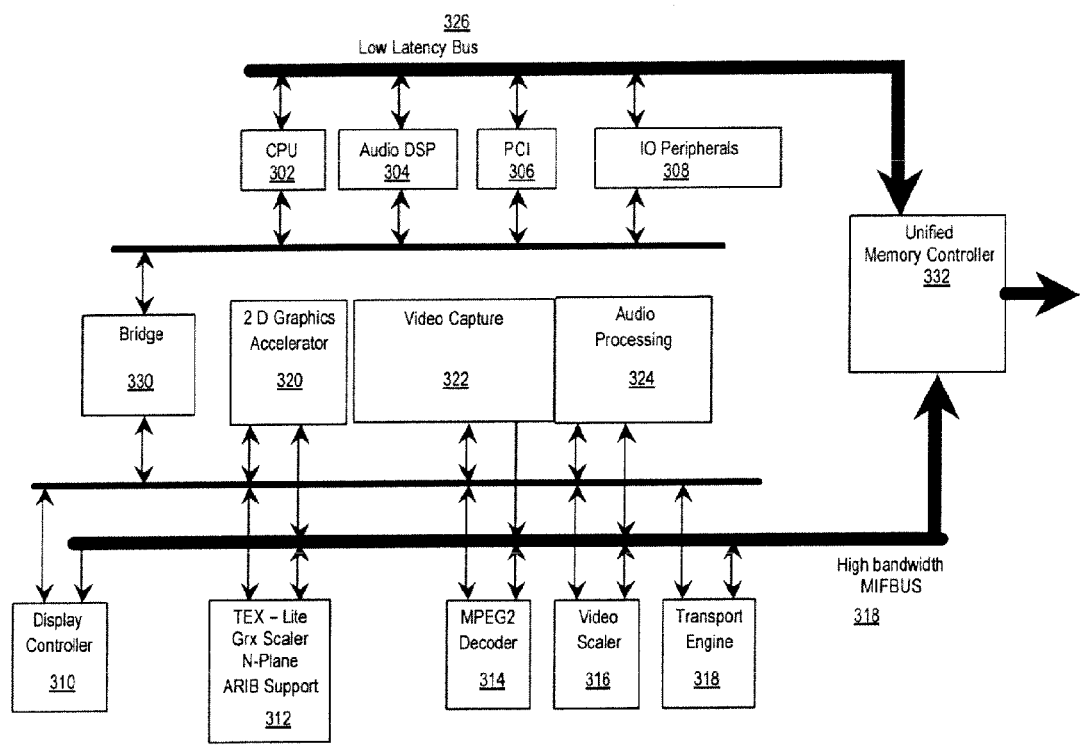
FIG. 3 illustrates one embodiment of an integrated DTV controller IC.

FIG. 3 illustrates one embodiment of an integrated DTV controller IC. The integrated DTV controller 202 integrates the functions of several components. In one embodiment, the controller 202 may include one or more of the following elements: a CPU 302, an audio digital signal processor (DSP) 304, a peripheral control interface (PCI) 306, input/output (I/O) peripherals 308, a display controller 310, a graphics scaler 312, an MPEG2 decoder 314, a video scaler 316, a transport engine 318, a two dimensional (2-D) graphics accelerator 320, a video capture component 322, and an audio processor 324. In one embodiment, the CPU 302, audio DSP 304, PCI 306, and I/O peripherals 308 are located on a low-latency bus 326. The low-latency bus 326 provides memory access to those components which need immediate memory access, and do not require high-bandwidth. In one embodiment, the high-bandwidth memory interface (MIF) bus 328 connects one or more of the 2-D graphics accelerator 320, the video capture component 322, the audio processor 324, the display controller 310, the graphics scaler 312, the MPEG2 decoder 314, the video scaler 316, and the transport engine 318 to memory. The MIF bus 328 provides memory access to the components that need large amounts of memory transfer, but may not need the memory immediately. The bridge 330 connects the CPU 302 to functional units for program control.

In one embodiment, the unified memory controller (UMC) 332 controls the access to the memory 226. The UMC 332 decides which memory accesses should be made by which components and when, based on the priority of the request, the length of time the request has been waiting, the size of the request, etc. In one embodiment, the UMC 332 attempts to provide high-bandwidth utilization while servicing the low-latency memory access requests.

Figure 4:
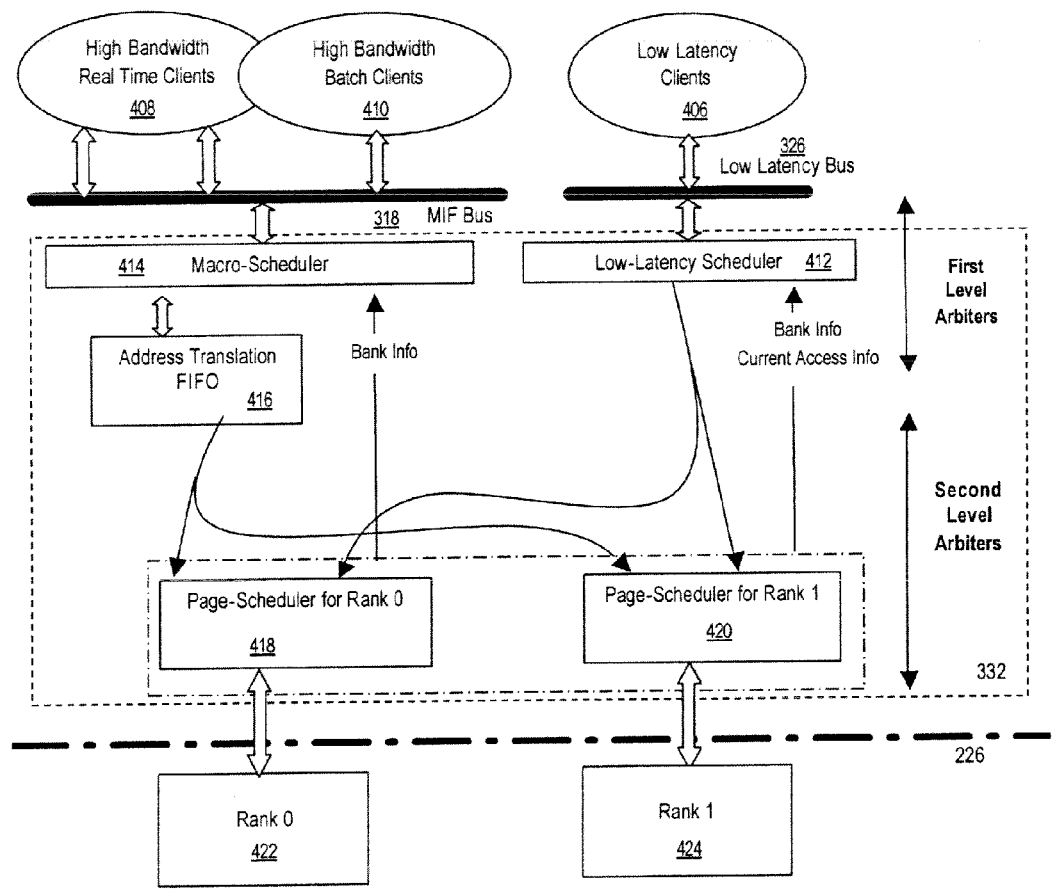
FIG. 4 illustrates a block diagram of one embodiment of a unified memory controller (UMC).

FIG. 4 illustrates a block diagram of one embodiment of a UMC 332. In one embodiment, the UMC 332 controls access to the unified memory. The UMC 332 receives memory access requests from several different clients. The UMC 332 determines which of the access requests will be filled, and when. In one embodiment, the UMC 332 uses a two-level arbiter to decide which accesses should be made. In one embodiment, the first level of arbitration can include two schedulers, a high-bandwidth client request scheduler such as the macro-scheduler 414 for high-bandwidth clients 408 and 410, and a low-latency scheduler 412 for low-latency clients 406. In one embodiment each of the schedulers 412 and 414 uses a series of factors, which will be discussed below, to determine the order in which memory accesses should be made. In one embodiment, output from the two schedulers 412 and 414 is input into two page schedulers 418 and 420 at the second level of arbitration. In one embodiment, the page schedulers 418 and 420 control the memory ranks 422 and 424, respectively, and arbitrate between high-bandwidth requests and the low-latency requests.

In one embodiment, the UMC 332 issues commands each cycle. In one embodiment, the UMC 332 can be simple and small enough so that it can issue commands every cycle. However, a simple memory controller may not be able to handle the diverse requirements of a complex system on an integrated circuit (IC). In one embodiment, the first level arbiters, the macro-scheduler 414 and the low-latency scheduler 412 can complete intensive tasks, leaving the simple bank scheduling to the second level arbiters 418 and 420.

The first level arbiters 412 and 414 can handle intensive scheduling tasks such as selecting a request based on criteria such as required done time, least recently scheduled client, etc., grouping the requests into reads and writes and reducing the switching between the access types, request reordering, increasing the priority for those accesses that have been waiting, and controlling the requests so as to perform "just-in-time scheduling." The second level arbiters 418 and 420 can be assigned simple tasks such as arbitrating among the requests scheduled by the first level arbiters 412 and 414, scheduling the interruption requests with low penalty, and reordering the bank commands for high throughput. In one embodiment, the client based scheduling issues are moved to the first level arbiters 412 and 414. In one embodiment, complex decision-making is possible in the first level arbiters 412 and 414, as these modules can be complex and span multiple cycles, as they are decoupled from the memory scheduling. This two level scheduling can make the page-schedulers 418 and 420 simple and faster. In one embodiment, the page schedulers 418 and 420 run in a single cycle and issue a request each cycle. Also, the page schedulers 418 and 420 can be run faster in order to take advantage of available high speed memory. For example, the simplified page schedulers 418 and 420 can be easily configured to run with DDR memories having increased frequencies.

In one embodiment, the UMC 332 also uses what is known as "just-in-time scheduling" in order to keep the memory banks available as much as possible. In one embodiment, a UMC 332 can control up to eight memory banks. Just-in-time scheduling ensures that access requests are not scheduled beyond what is needed for continuous data throughput from the memory 226. Further, in one embodiment, the UMC tries to open fewer memory banks, if possible. This can make more banks available for the low-latency clients 406 to achieve low-latency. Also, in one embodiment, an urgent real-time request can be scheduled immediately if fewer requests are scheduled at that point, reducing the waiting time for the real-time clients 408 and 410.

In one embodiment, a traffic controller mechanism is designed to achieve high-bandwidth, in turn keeping the memory banks open for low-latency clients 406. For achieving continuous data flow from the banks of the memory, in one embodiment the UMC 332 can use two banks for scheduling. While one bank is transferring data, the other bank is precharged and activated for immediate data transfer. The traffic controller module can issue the request for the banks based on the bank availability, number of banks occupied, and the number of words remaining. Since the just-in-time scheduling can be done by a macro-scheduler 414, in one embodiment, an aggressive activated, precharged mechanism is used in the page-scheduler 418 or 420. This can provide effective command bus usage giving high-bandwidth and having banks available for low-latency clients 406 at the same time.

In one embodiment, the UMC 332 also uses high performance scheduling. Several optimizations can be made to improve access. First, in one embodiment, the low-latency clients 406 can be mapped to access data from a single memory row so that the access requests will not fall into multiple banks. This can improve the performance of the interrupt mechanism, which is discussed below. Second, the number of total banks in the unified memory 226 can be increased to reduce the latency of the memory. Finally, making more banks available for scheduling at a given time can reduce the latency of the memory access. The address mapping can map the requests into multiple banks, which can reduce the occurrence of two requests being made to the same bank at the same time. By separating two requests to the same bank in time, requests to other banks can be serviced by the memory concurrently with closing of the same bank for the first same bank access and opening of the same bank for the second same bank access. This address mapping can also reduce the size of each request and divide the requests so that they fall in more than one rank, which can reduce the average turn around time for all 2-D requests.

Finally, in one embodiment, the UMC 332 may employ a self-balancing scheduling mechanism. This mechanism directs the UMC 322 to generally schedule low-latency requests before high-bandwidth requests. However, if there are repeated low-latency access requests, this may cause the high-bandwidth clients 408 and 410 to starve. In the case of starvation, the UMC 332 may force high-bandwidth access requests through to the memory 226 until the starvation ends.

In one embodiment, the UMC 332 receives input from the low-latency bus 326 and the MIF bus 328. The low-latency bus 326 receives memory access requests from the low-latency clients 328. The low-latency clients include components such as the CPU 302 and the I/O peripherals 308 that require quick memory access. The MIF bus 318 receives requests from the high-bandwidth real time clients 408, such as video processors, and from high-bandwidth batch clients 410, such as graphics processors. The batch clients 410 can receive several memory requests in a single batch. For example, the graphics processor edits static graphics. In one embodiment, the batch clients 410 can wait for memory access. The real time clients 408, however, use a constant stream of data to avoid interruption of the client output.

In one embodiment, the low-latency clients 406 will receive the highest priority for access to the memory. The real time clients 408 will receive the next highest priority, and the batch clients 410 will generally receive the lowest priority. However, in one embodiment, there will be several cases in which, for example, a real time client 408 will receive priority over a low-latency client 406. These situations will be explained below.

In one embodiment, once the low-latency bus 326 receives memory access requests from a low-latency client 406, the requests will be sent to the low-latency scheduler 412. Likewise, the requests from the high-bandwidth clients 408 and 410 on the MIF bus 318 will be sent to a macro-scheduler 414. In one embodiment, the low-latency scheduler 412 and the macro-scheduler 414 are first level arbiters. In other words, the schedulers 412 and 414 will decide which access requests originating from their respective buses 318 and 326 should have the highest priority. Any number of different classes of clients or different configurations or number of schedulers can be utilized. For example, in one embodiment, the real time clients 408 and the batch clients 410 may each use a separate scheduler. The operation of the first level arbiters will be discussed in detail with respect to FIGS. 7 and 8.

In one embodiment, the access requests are subject to two levels of arbitration. On the first level, the arbiters 412 and 414 choose a request order for requests issued by the clients they are handling. Here, the macro-scheduler 414 handles requests by high-bandwidth clients, and the low-latency scheduler 412 handles requests by low-latency clients. Each of the schedulers 412 and 414 in the first level of arbitration outputs the requests to the second level arbiters. According to one embodiment, the second level arbiters 418 and 420 each control access to a memory rank. Here, the page scheduler 418 controls memory rank 0 422, and the page scheduler 420 controls memory rank 1 424. In one embodiment, a memory rank comprises several memory banks, and may be a separate IC. In one embodiment, each of the second level arbiters 418 and 420 receives all of the requests for memory access to the rank to which it is assigned, and the arbiters 418 and 420 then decide the order in which the requests will be made. In other words, the first level arbitration is client specific, while the second level arbitration is assigned to a specific portion of the memory.

The first level arbiters 412 and 414 output memory addresses. Because the high-bandwidth MIF bus 318 will generally issue requests to many banks, in one embodiment the requests will be made as "two-dimensional" (2-D) requests. FIGS. 6A-E illustrate several exemplary two dimensional memory requests, which will be described below. In one embodiment, the low-latency scheduler 326 outputs a simple, linear one-dimensional (1-D) memory access request because the low-latency requests are generally for smaller amounts of data. In one embodiment, an address translator 416 accepts the 2-D requests from the macro scheduler 414 and translates them into 1-D requests. This will be explained further with respect to FIGS. 6A-E.

Figure 5:
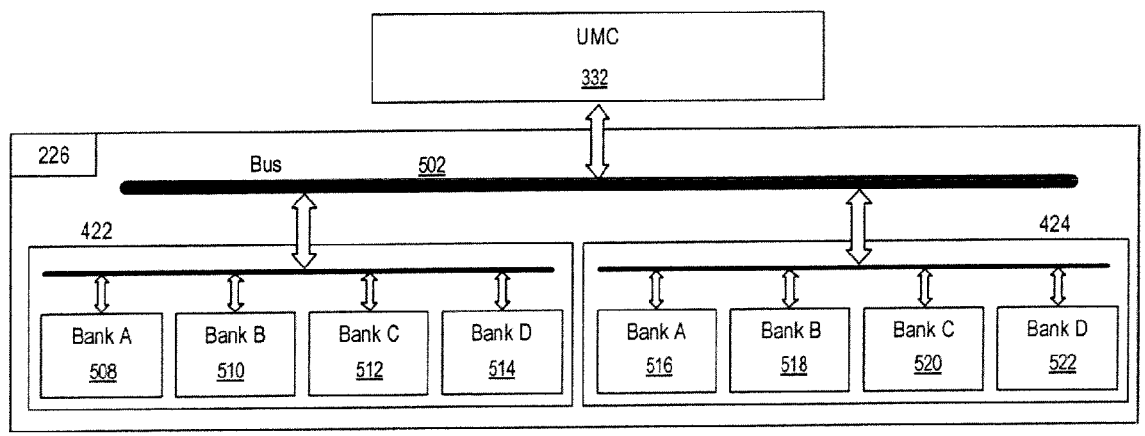
FIG. 5 illustrates one embodiment of an external memory subsystem coupled with a UMC.

FIG. 5 illustrates one embodiment of an external memory subsystem coupled with a UMC 332. The UMC 332 is coupled with a memory bus 502 within the memory 226. In one embodiment, the memory bus 502 is coupled to two separate memory ICs 422 and 424. In one embodiment, a memory rank 422 or 424 may comprise an entire memory IC, and further may comprise several memory banks. Alternatively, the memory may be a single IC, or multiple ICs. In one embodiment, each of the memory ICs 422 and 424 has four memory banks. The IC 422 is a memory rank "0" having a memory bank "A" 508, bank "B" 510, bank "C" 512, and bank "D" 514. The IC 424 is a memory rank "1" having the memory banks "A" 516, bank "B" 518, bank "C" 520, and bank "D" 522. Several alternative configurations could be used. The configuration of memory ICs into banks in various ways is known in the art. The present invention is independent of the actual memory configuration used.

Each of the memory banks is a physically separate group of memory cells within an IC. In one embodiment, when scheduling requests, it is advantageous to avoid scheduling multiple memory requests to the same bank at the same time. For example, if the system were to schedule two successive access requests to bank "A," in one embodiment, the bank has to open, access, and close the row corresponding to the first request before the second request can begin opening a different row in the same bank. On the other hand, if the system scheduled an access to bank "A" first, and then to bank "B", the request to the "B" bank could be opening while the request to the "A" bank is being accessed. This saves overhead costs, because while the memory ICs 422 and 424 can only access one bank at a time, other operations, such as opening and closing, can happen in parallel, if the requests are being made to different banks.

In one embodiment, once access requests have been ordered by the macro-scheduler 414 and the low-latency scheduler 412, the requests are sent to both page schedulers 418 and 420. The page schedulers 418 and 420 schedule page requests for the memory rank 0 422 and the memory rank 1 424, respectively. The memory ranks 422 and 424 are shown in further detail in FIG. 5. The requests from each first level arbiter 412 and 414 are sent to both page schedulers 418 and 420 in order to have access to all of the available memory in both ranks 422 and 424. The page schedulers 418 and 420 determine which memory accesses will be processed and in what order. In one embodiment, the page schedulers 418 and 420 are second level arbiters, which determine which accesses will be made after the accesses have been determined by the client specific first level arbiters. The page schedulers 418 and 420 directly control access to the ranks 422 and 424. In one embodiment, the page schedulers 418 and 420 also send information regarding the availability of the memory banks back to the first level arbiters 412 and 414, so that the first level arbiters 412 and 414 can schedule access requests to available memory banks.

Figures 6A, 6B, 6C:
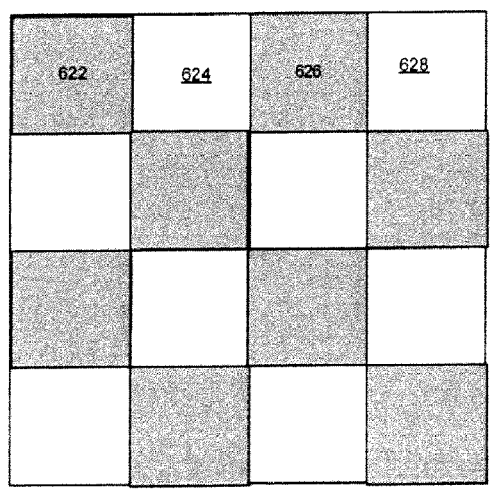
FIGS. 6A-E illustrates examples of 2-D memory mapping.

FIGS. 6A-E illustrate examples of 2-D memory mapping. In one embodiment, high-bandwidth clients 408 and 410 use 2-D memory mapping, which can reduce the access time for the high-bandwidth clients 408 and 410. The 2-D mapping can use a logical canvas which is called as a frame. FIG. 6A illustrates one possible page mapping of small 2-D frame 600. Requests that fall in the frame can distribute themselves into different banks as adjacent pages are mapped to different banks. In one embodiment, the banks in the frame 600 are shown as bank A 602, bank B 604, bank C 606, and bank D 610. As the size of frame 600 increases, the same mapping scheme can be expanded so that any four adjacent banks as are as different as possible. The frames are mapped differently based on whether they are even or odd. FIG. 6A shows a logical page mapping of an even frame 600 and FIG. 6B shows a page mapping of an odd frame 610. The banks in the odd frame 610 are shown as bank D 612, bank C 614, bank B 616, and bank A 618. The logical page mapping of the even frame 600 is a mirror image of the odd frame 610. In one embodiment, if two clients are making requests using two frames, one even 600 and one odd 610, then all the requests will be distributed into different banks. For example, if two even frames 600 were issued, the memory bank A would be accessed by two requests at the same time. In order to accommodate these requests, bank A would have to be accessed serially—the requests would be made one after another. In one embodiment, two frames—one even 600 and one odd 610—were issued, one would access bank A first, and the other would access bank D first. Since the accesses are to two different banks, these two accesses can be made in parallel at the same time. This mirror imaging of 2-D requests significantly reduces memory access times.

FIG. 6C illustrates rank tiling within a page. A memory mapping scheme for a page is shown in FIG. 6C. In one embodiment, each page falls completely inside the appropriate physical row of memory access. Each rank of memory is mapped into different memory IC unit. In one embodiment, the UMC 332 controls two ranks of memory 422 and 424. In one embodiment, each of the pages, such as pages 622, 624, 626, and 628, is mapped as shown in an alternating fashion into two ranks of the memory 422 and 424. The tile 620 shows typical rank tiling with in a page. The blocks 622 and 626 fall in rank 0 422, while the blocks 624, 628 fall in rank 1 623. In one embodiment, the tiling of the page can be extended further so that each page can be tiled to 4, 8, 16, or 32 blocks, where each block corresponds to a small access in a rank. A typical tiling of 16 blocks is shown in FIG. 6C.

Figure 6D:
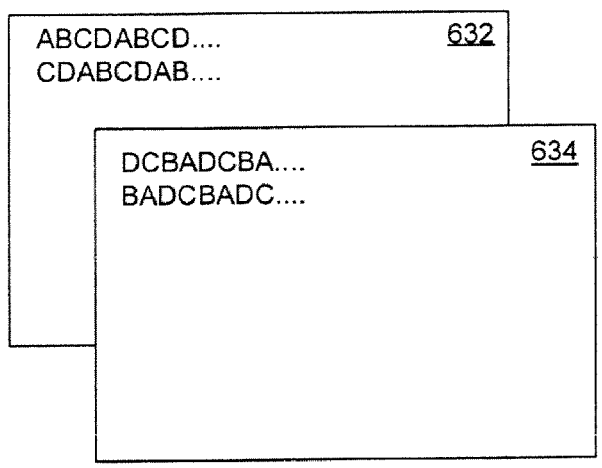

FIG. 6D illustrates the interleaving of field buffers. The requests 632 and 634 are similar to the frames 600 and 610, shown in a different manner. Here, the requests are displayed linearly, and it can be seen that each separate request in the frames 632 and 634 is accessing the specific banks at different times. FIG. 6D illustrates page tiling of two frame buffers. The frame 632 shows an even field buffer page mapping and the frame 634 shows odd field buffer page mapping. High-bandwidth video applications may typically use two frames at a time. Since the two frames 632 and 634 are mirror images of each other, the requests will be distributed into different banks at a time, so that the UMC 332 will not try to access the same bank at the same time.

Figure 6E:
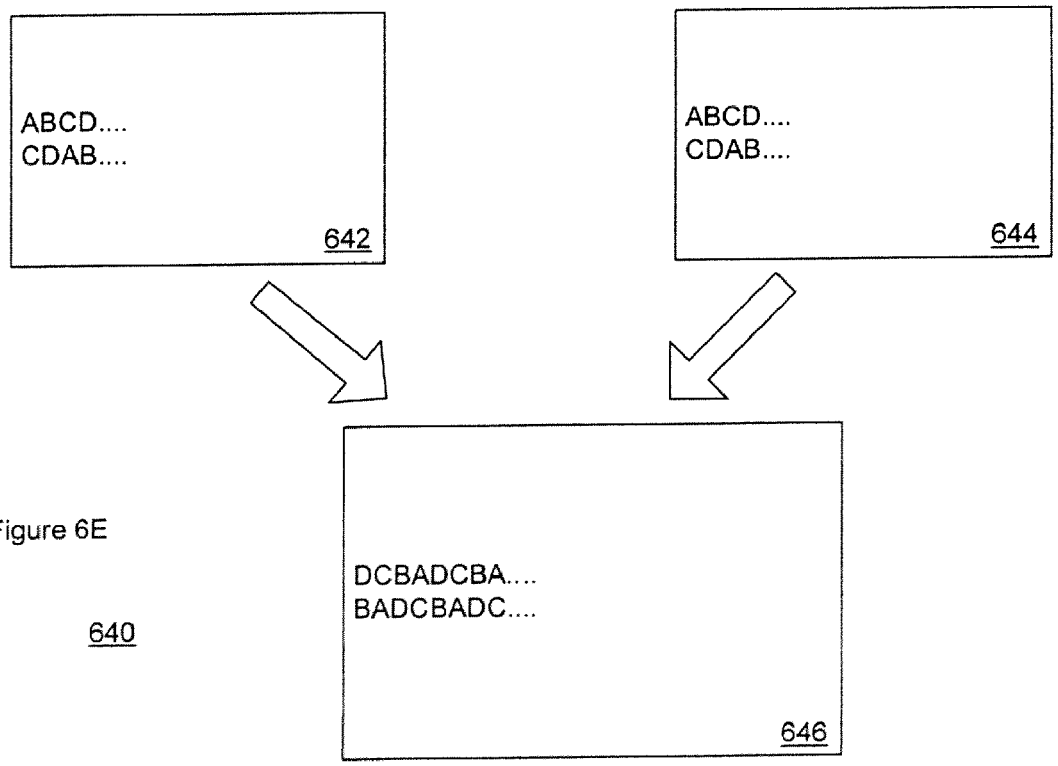

FIG. 6E illustrates interleaving when blending frame buffers. Frames 642 and 644 may be similar to the frame 600 of FIG. 6A. The frame 646 may be similar to the frame 610 of FIG. 6B. In one embodiment, the three frames 642-646 may occur at the same time. The frames 642 and 644 may be, for example, read requests, and the request 646 may be a write request. In order to prevent the read and write requests from trying to access the same banks at the same time, the requests mirror each other, as in FIGS. 6A and 6B. In this way, a write access request is not being made to a bank where a read access is occurring at the same time. By interleaving the requests, overhead time is significantly reduced, since requests are being made to all banks, rather than having some banks unutilized while others have a large queue of requests. Alternative embodiments for interleaving to distribute access across the memory and the individual banks may be implemented as well. The application can choose the type of frame buffer it wants use depending on the access to optimize the bank usage.

FIG. 7A illustrates a block diagram of one embodiment a low-latency scheduler. In one embodiment, the low-latency scheduler 412 receives access requests from the low-latency bus 326. In one embodiment the low-latency bus 326 receives access requests from several low-latency clients, such as a CPU 302, a PCI 306, an audio digital signal processor (ADSP) 304, and a serial input/output (SIO) device 308. The requests are collected by the bus state machine 712.

The bus state machine 712 sends the requests to the scoring logic 714. The scoring logic 714 takes individual access requests and assigns a score to each request, which represents the priority to be given to the specific request. In one embodiment, the score is a binary score. In one embodiment, the scoring logic 714 uses input from the two page schedulers 716 and 718, as well as other factors to assign a score. The input from the two page schedulers 716 and 718 comprises bank availability and read/write feedback information 720 and 722 that will be explained below. FIG. 7B illustrates one embodiment of a system for determining the binary score used by the scoring logic 714. In one embodiment, the logic score 750 uses four factors: aging 752, whether the requested memory is currently reading or writing 754, whether the bank is available 756, and a user programmable client priority 758. In one embodiment, each of the four factors 752-758 may be a one bit binary number. The order of these entries can be rearranged depending on the requirements of the particular implementation. The aging factor 752 can be set to be a binary '1' when the access request has been waiting a predetermined amount of time. The read/write factor 754 is a '1' if the request is a read request and the memory is currently reading, or if the request is write request and the request is currently writing. It is more efficient to process a series of requests of the same type, since there is a time overhead involved in switching from a read request to a write request and vice versa. The bank availability bit 756 is set to '1' if the bank being requested is currently available. The user programmable bit 758 can be set to '1' if a user has specified that the specific access request type should receive priority.

In one embodiment, a binary number comprising the bits of the priority number 750 can be created. For example, if the aging bit 752 is '0', the read/write bit 754 is '1', the bank availability bit 756 is '1', and the user programmable bit 758 is '0', the priority score assigned to the request would be 0110. This request would take priority over a request having a score of 0011, but would not take priority over a request having a score of 1000 or 0111. Alternative rankings may be used. In one embodiment, each of the entries can have multiple bits for each of the fields, allowing for different levels of priority. Further, it is understood that any order of the factors, or any other alternate factors, may be used.

Returning to FIG. 7A, once the scores have been tabulated by the scoring logic 714, they are sent to a competition tree 724, where the scores are compared, and a best low-latency request 726 is chosen. The best request 726 is then sent to the page-schedulers 716 and 718, which will ultimately determine which requests get fulfilled, and when they will get fulfilled.

FIG. 7C is a flowchart describing a process 770 for determining a winning low-latency request. At block 772, low-latency requests are collected. In one embodiment, the memory access requests are issued by various low-latency clients, and are collected in the bus state machine 712. In block 774, a priority score is assigned to each request. The priority score is described above, and in one embodiment priority is given based on the age of the request, whether the page scheduler is reading or writing (and whether the request is a read or write request), whether the requested bank is available, and whether the user has given certain clients priority.

In block 776, a winning request is chosen. In one embodiment, the request that has the highest binary score, as described above, is chosen as the winning request. In block 778, the winning request is sent to the appropriate page scheduler. The process describes how the low-latency scheduler chooses the order of low-latency requests for the page schedulers. As previously mentioned, when a low-latency request is issued, it will generally be given priority over a high-bandwidth request, since there are typically many more high-bandwidth requests.

Figure 8:
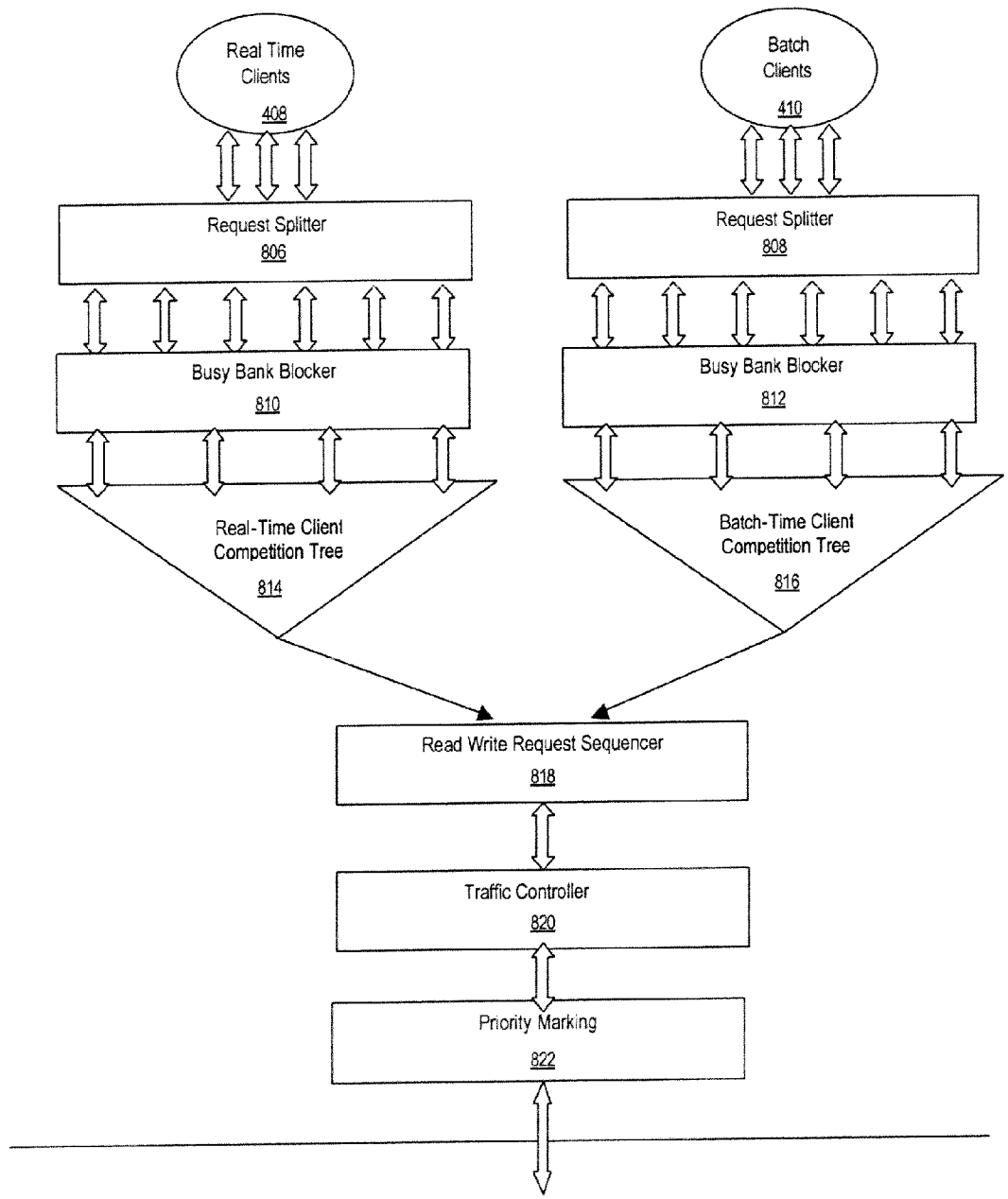
FIG. 8 illustrates a block diagram of one embodiment of a macro-scheduler.

FIG. 8 illustrates a block diagram of one embodiment of a macro-scheduler. The macro-scheduler 414 is the first level arbiter for high-bandwidth clients. In one embodiment, the macro-scheduler 414 handles memory access requests from real time video clients 408 and batch time graphics clients 410. The real-time clients 408 are typically high-bandwidth clients, such as video clients, that require continuous memory access. For example, if a real-time client 408 was a video client, and the client was displaying a video, if memory access were interrupted the video might also be interrupted. Batch time clients 410, on the other hand, may require high-bandwidth, but can wait for memory access to be delivered. For example, if a batch client were waiting for a graphic image to be transmitted, it would not need to access the memory incrementally, and it would be able to wait until the entire graphic were transmitted to the client.

In one embodiment, the real-time 408 and batch time 410 clients send their memory requests to their respective request splitters 806 and 808. High-bandwidth clients typically request large chunks of data at one time. The request splitters 806 and 808 split the requests into smaller, more manageable pages of data. The page requests are then sent to their respective busy bank blockers 810 and 812. The busy bank blockers 810 and 812 receive information from the page schedulers 418 and 420 about which blocks of the memory are busy. If a request is to access a busy bank, the busy bank blockers 810 and 812 will hold the access request until the bank is again available.

The requests are then sent to the real-time client competition tree 814 and the batch time client competition tree 816. The competition trees 814 and 816 sort the inputted requests and each output a highest priority request or "winner" for a read and for a write. Embodiments of the competition trees are discussed with respect to FIGS. 9 and 10 below. The read/write sequencer 818 receives the winning requests and groups the requests according to reads and writes. If an urgent request comes through, the read/write sequencer 818 may rearrange the requests to speed the urgent request through. Otherwise, the sequencer 818 will attempt to keep the switching between reading and writing to a minimum. The traffic controller 820 can control the requests so that there are enough requests for uninterrupted data access by not over scheduling. This can reduce the wait time for a real-time urgent access. This can create more available banks for the low-latency clients. In one embodiment, the priority marker 822 will look at the requests, and if one has been waiting for a predetermined time, will mark it urgent, so that it is sent before other requests. Also, the higher priority clients may be given privilege in the page schedulers to reduce any further delay in scheduling. Once the final, winning request has been determined, it will be sent to the appropriate page scheduler.

Figure 9:
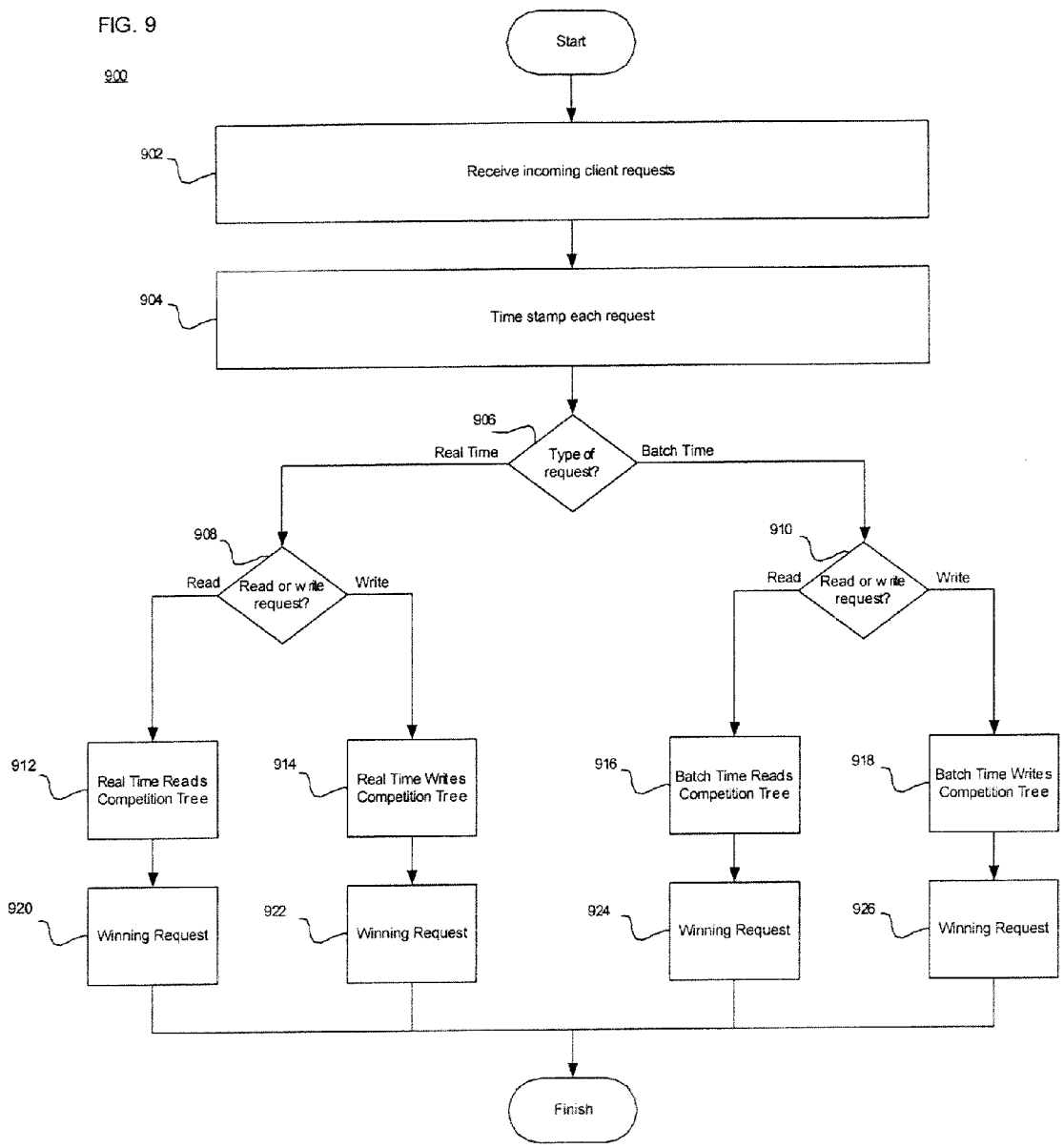
FIG. 9 illustrates a flow chart of one embodiment of determining priority for high-bandwidth client requests.

FIG. 9 illustrates a flow chart for one embodiment of determining priority for high-bandwidth client requests. A scheme of categorizing several clients and like clients competing together is shown. In block 902, the client requests from the high-bandwidth clients are received. In block 904, the requests are each given a time stamp, so that it can later be determined how long the individual requests have been waiting to be processed. The time stamp unit 904 can be configured depending on the bandwidth, type of client, application, etc. A client can issue real-time requests as well as batch requests. For example, in one embodiment a scaler can be used for video scaling and graphics scaling. The scaler could configure its requests as real-time when it is scaling video, and batch when it is scaling graphics. In block 906, the requests are categorized into real-time requests and batch time requests. The real time requests are sent to block 908. The batch requests are sent to block 910.

At block 908, the real time requests are divided into read requests and write requests. The read requests are sent to the competition tree 912, and the writes are sent to the competition tree 914. The competition trees 912 and 914 determine which requests should be filled first. Similarly, the block 910 outputs reads and writes to the competition trees 916 and 918 respectively. The result is the "winners"—the requests 920, 922, 924, and 926. In one embodiment, these requests will be sent to the page schedulers. The categorization of clients and like clients competing together can be extended to many groups of clients using different criteria. The embodiment shows an example of categorization and the categorization basis.

Figure 10:
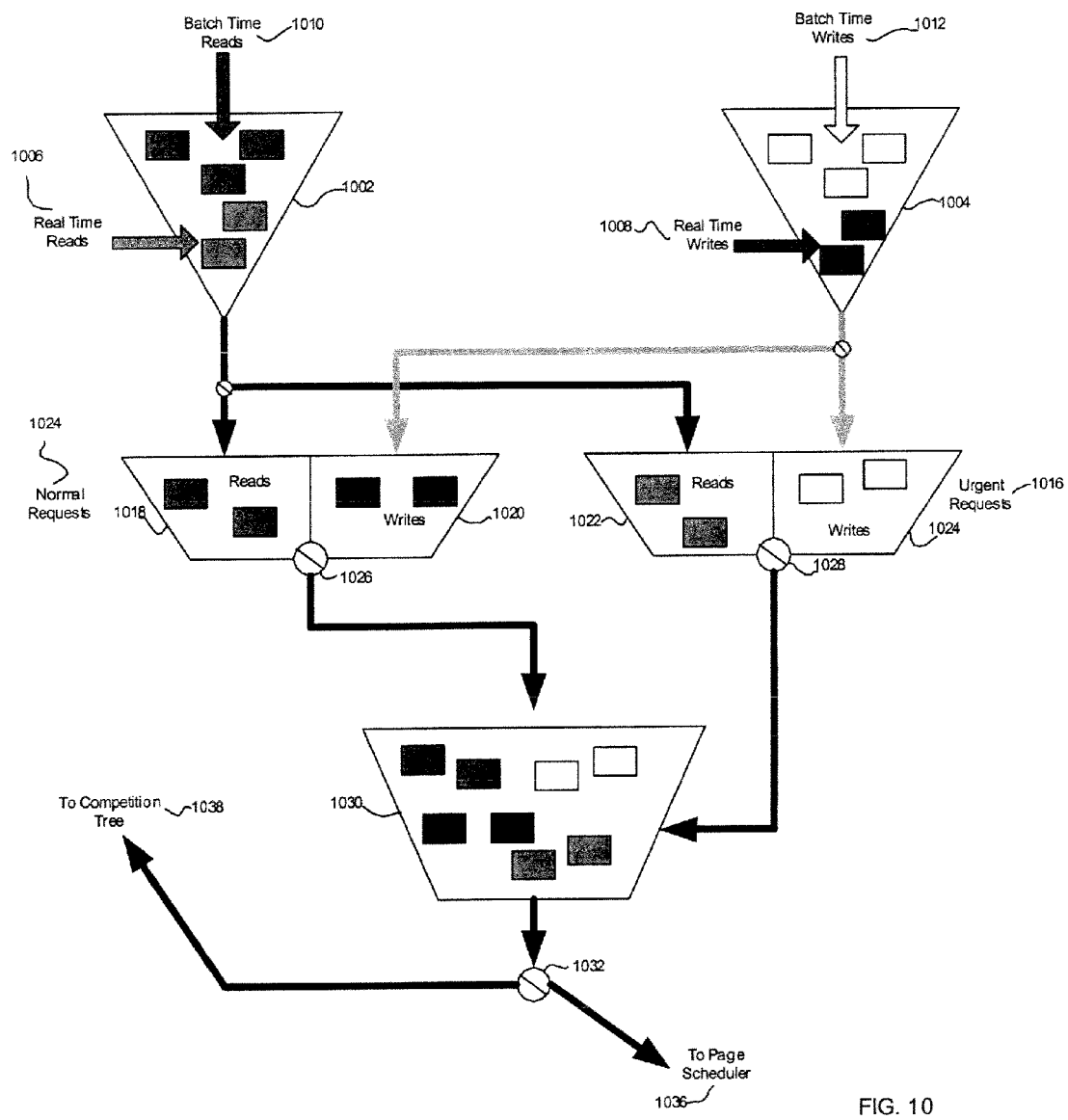
FIG. 10 illustrates a functional view of one embodiment of a macro-scheduler decision process.

FIG. 10 illustrates a functional view of one embodiment of a macro-scheduler decision process. The scheduler 414 can be thought of as having several "funnels" 1002, 1004, 1014, 1016, 1030, which filter several requests into a single stream of ordered requests. In one embodiment, these funnels 1002, 1004, 1014, 1016, 1030 are competition trees. In one embodiment, the read funnel 1002 accepts all high-bandwidth read requests, and the write funnel 1004 accepts all high-bandwidth write requests. In one embodiment, since the real-time reads 1006 and writes 1008 generally want their accesses to be filled first, the real-time requests will generally enter at the bottom of the funnels 1002 and 1004. That is, any real-time memory access request will generally be given priority over a batch memory access request. The batch access read requests 1010 and write requests 1012 enter at the top of the funnels 1002 and 1004, respectively, since the batch requests can be delayed while other requests are being filled.

In one embodiment, two more funnels, the normal request funnel 1014 and the urgent request funnel 1016 receive the requests from the first funnels 1002 and 1004. A request can be marked urgent, if, for example, the timestamp on the request indicates that the request has been waiting for longer than a predetermined time. In one embodiment, the urgent requests are sent to the urgent funnel 1016, and all other requests are sent to the normal funnel 1014. In one embodiment, the normal funnel 1014 is split up into two "bins"—a read bin 1018 and a write bin 1020. Similarly, in one embodiment, the urgent funnel 1016 is split up into a read bin 1022 and a write bin 1024. The read requests are deposited in the read bins 1018 and 1022, and the write requests are deposited in the write bins 1020 and 1024. At the bottom of each of the funnels 1014 and 1016 is a switch block 1026 and 1028, respectively. The switch blocks 1026 and 1028 will decide which access requests—reads or writes—are sent to the next funnel 1030. If the memory is currently writing, for example, the switches 1026 and 1028 will send write requests to the funnel 1030. As noted above, in one embodiment, the UMC 332 wants to group reads and writes together, since overhead may be expended while switching between read and write operations.

The funnel 1030 receives the urgent requests at the bottom, before the normal requests come in. Since the urgent requests have been marked as such, they will be processed before all other requests. The traffic controller 1034 will attempt to keep the memory banks open. The traffic controller 1034 can attempt to schedule just enough access requests so that the memory banks remain open. Depending on the load in the page scheduler, low-latency scheduler, and the urgency of real time requests, the traffic controller 1034 can either schedule the request or send it back to the appropriate first funnel 1002 or 1004.

Figure 11:
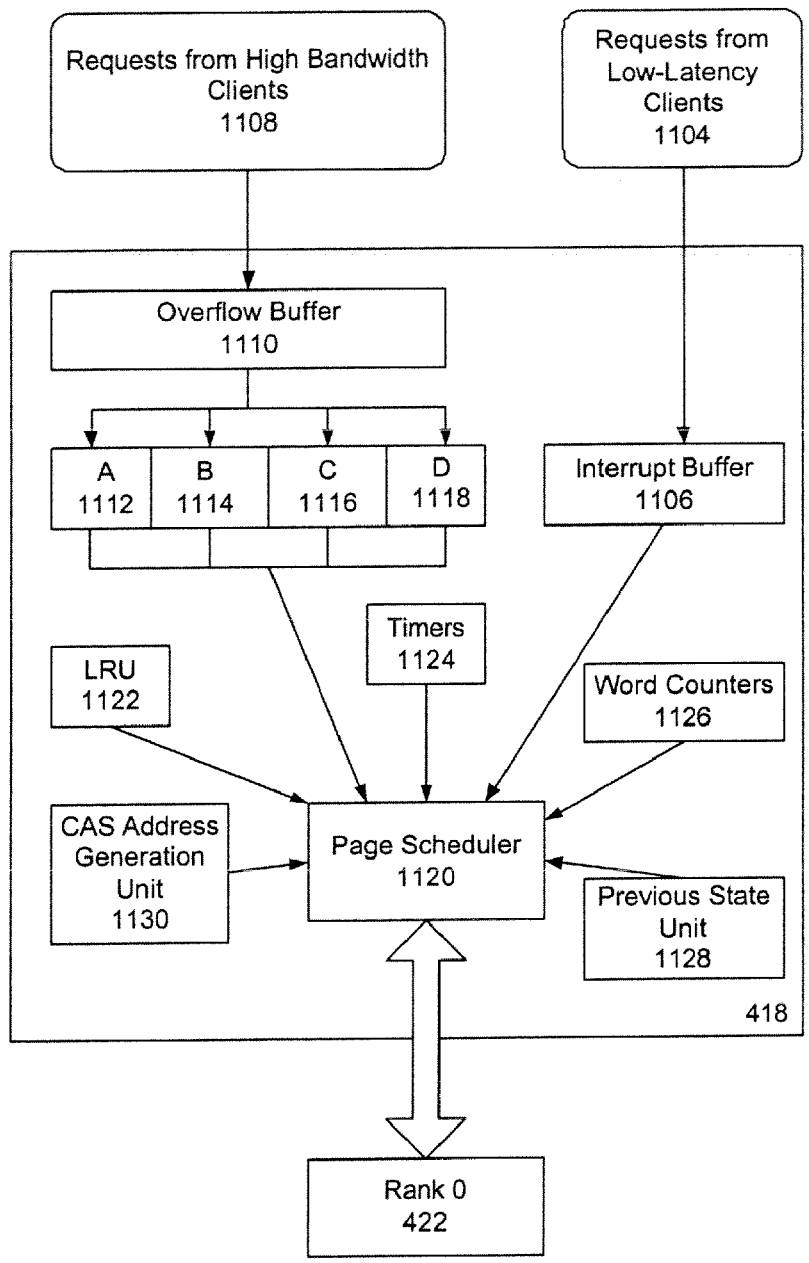
FIG. 11 illustrates a block diagram of one embodiment of a page-scheduler.

FIG. 11 illustrates a block diagram of one embodiment of a page-scheduler. The page scheduler 418 can control a memory to which it is attached, such as the memory 422. The page scheduler 420 and the page scheduler 418 operate in a similar manner. Low-latency access requests 1104 enter the interrupt buffer 1106. The interrupt buffer 1106 will interrupt the other scheduled requests, in one embodiment, because the low-latency requests are generally of the highest priority. The bank buffers 1112, 1114, 1116, and 1118, each correspond to the memory banks A, B, C, and D of the rank 422. The bank buffers 1112-1118 store requests that are directed toward the specific bank for which the buffer is designated. When a request is made, the specific page of memory will be located in one of the four banks of the memory 422. A request for a page is sent to the appropriate bank buffer 1112-1118. The high-bandwidth requests 1108 can either enter the bank buffers 1112-1118, or the overflow buffer 1110 if the bank buffers 1112-1118 are occupied. In one embodiment, the overflow buffer 1110 can store an extra request if a request in the appropriate bank is pending due to low-latency interruption.

The page scheduler 1120 looks at the requests being held in the buffers 1106 and 1112-1118. In one embodiment, priority is given to the interrupt buffer 1106, since the interrupt buffer 1106 holds requests for the low-latency clients. However, if there are so many requests coming from the interrupt buffer 1106 that the high-bandwidth clients 1108 are being starved, the page-scheduler 1120 can force some requests from the bank buffers 1112-1118 through using the low penalty interrupt mechanism described below. The page scheduler 1120 determines which commands to issue the memory 422 based on the requests available. In the example shown, the page scheduler 1120 has five different requests to choose from.

In one embodiment, the UMC 332 uses a low penalty interrupt mechanism. In a further embodiment, a low-latency access request may interrupt a high-bandwidth request. However, in one embodiment, if the low-latency request is being made to a bank that is currently being accessed, the request is delayed in order to avoid an overhead cost incurred by interrupting an access already being made. The interruption of a macro-scheduler access can be done in several ways. One method is immediately interrupting the current access regardless of whether the low-latency request falls in the same bank currently being accessed. This provides the shortest turn around time possible. However, high-bandwidth clients may be adversely affected. Another method is to wait for the completion of the request access. This may result in too much latency for a low-latency client.

In one embodiment, the following low penalty interrupt mechanism is used. If the low-latency request falls in bank that is not currently being accessed, interruption can be done at the column address strobe (CAS) boundary. If the low-latency request falls in a bank that is currently being accessed, the request can be delayed until the current access is complete. In one embodiment, interrupting the current access in the same bank may be more costly than completing the access. So, the exemplary low penalty interrupt mechanism allows the current access to complete its access to the desired bank.

Further, in another embodiment, reducing the access request size in each of the banks can reduce latency. Access size can be reduced using a memory mapping mechanism, where each of the access requests is further divided into pages, which may be of reasonable size so that they will not occupy the bank for an extended time.

In one embodiment, the page scheduler decides which of the requests in the bank buffers 1112-1118 to execute based on the determinations of several units, including the least recently used (LRU) unit 1122 and the previous state unit 1128. The LRU unit determines which of the banks of the memory 422 has least recently been used. In one embodiment, the requests in the bank buffers 1112-1118 are then ordered by the least recent use. This attempts to ensure that all of the memory banks are accessed equally. In one embodiment, the timers 1124 ensure that a request is ordered so that there is no timing violation in the memory 422. In one embodiment, the word counters 1126 count the accesses to the memory to ensure that there is a continuous data stream to and from the memory 422 by predicting when the current requests will be complete, and the word counters 1126 can and also help with load balancing. In one embodiment, the previous state unit 1128 determines whether the last access was a read or a write. In this way, the page scheduler 1120 can attempt to schedule accesses for the current state of the memory. In one embodiment, the page scheduler 1120 can forward this information, as well as the information from the LRU unit 1122 to the first level arbiters to try to group reads and writes together to avoid switching between the two. In one embodiment, the column address strobe (CAS) address generation unit 1130 converts an access request into an address that can be understood by the memory 422. The address is forwarded by the page scheduler 1120 to the memory to perform the memory access. In one embodiment, the page scheduler 1120 ultimately decides which access to make, and using the address generated by the CAS address generation unit 1130, instructs the memory 422 to access the specific data.

Figure 12:
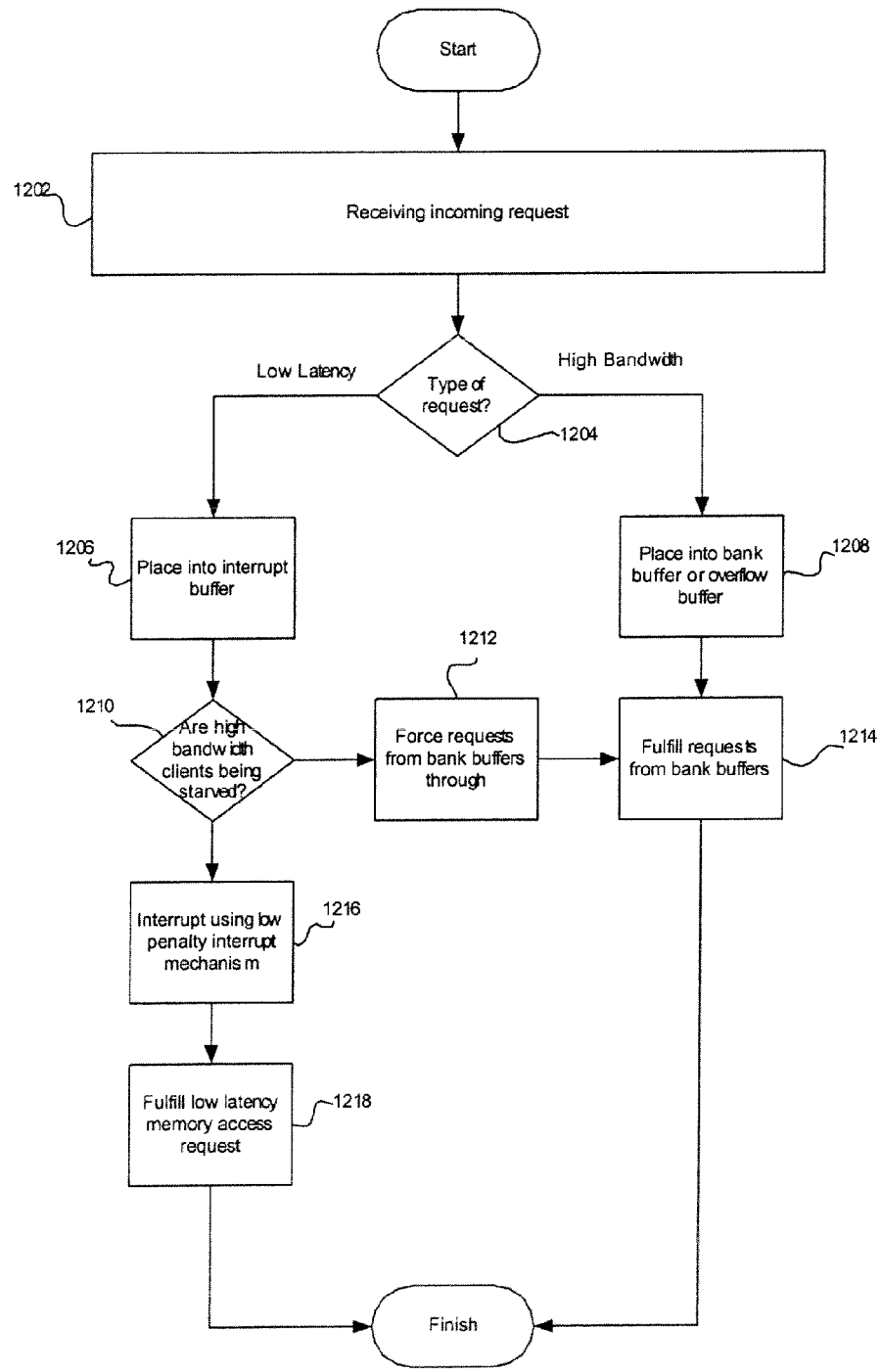
FIG. 12 is a flowchart describing one embodiment a process 1200 for fulfilling memory access requests using a page scheduler.

FIG. 12 is a flowchart describing one embodiment of a process 1200 for fulfilling memory access requests using a page scheduler. In block 1202, an incoming memory access request is received. The requests may be high-bandwidth or low-latency requests. In block 1204, the type of request is determined. If the request is from a low-latency client, the process 1200 continues to block 1206. If the request is from a high-bandwidth client, the process 1200 continues to block 1208.

In block 1206, the request is placed in the interrupt buffer. As mentioned above, the interrupt buffer can interrupt the current queue of access requests to the memory rank when a low-latency client is requesting access. In block 1210, it is determined whether high-bandwidth clients are being starved. If they are, in one embodiment, high-bandwidth requests from the bank buffers are forced through in block 1212. In block 1214, the high-bandwidth requests are fulfilled.

If the high-bandwidth clients are not being starved, in block 1216, the page scheduler 1120 is interrupted using the low penalty interrupt mechanism, described above. In block 1218, the low-latency request is fulfilled.

If, in block 1204, it is determined that the memory access request is from a high-bandwidth client, the request is placed in either the overflow buffer, or the appropriate bank buffer, as described above. In block 1214, the high-bandwidth requests are fulfilled in the order determined using the LRU, timers, etc., as described above.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

The invention claimed is:

1. A unified memory controller (UMC) comprising:
   a plurality of schedulers to receive incoming memory access requests for accessing a memory; to classify the incoming memory access requests into a categorization that distinguishes between low-latency memory access requests, high-bandwidth real-time memory access requests and high-bandwidth batch memory access requests; to employ at least one competition tree to sort the incoming memory access requests; and to prioritize accesses to the memory in response to the incoming memory access requests based on the sorting by the at least one competition tree for said categorization.

2. The UMC of claim 1, wherein the plurality of schedulers comprise:
   a page scheduler to schedule memory access requests;
   a high-bandwidth client request scheduler coupled to the page scheduler to schedule high-bandwidth real-time requests from high-bandwidth real-time clients and to schedule high-bandwidth batch requests from high-bandwidth batch clients; and
   a low-latency scheduler coupled to the page scheduler to schedule low-latency requests from low-latency clients.

3. The UMC of claim 2, wherein the high-bandwidth client request scheduler arbitrates requests from high-bandwidth real time clients and from high-bandwidth batch clients.

4. The UMC of claim 3, wherein the high-bandwidth real time clients are given priority over the high-bandwidth batch clients.

5. The UMC of claim 3, wherein:
   high-bandwidth real time clients need continuous and timely memory access; and
   high-bandwidth batch clients consume memory access not used by the high-bandwidth real time clients.

6. The UMC of claim 2, wherein the page scheduler comprises a first page scheduler to control a first memory rank and a second page scheduler to control a second memory rank.

7. The UMC of claim 2, wherein the high-bandwidth client request scheduler and the low-latency scheduler collectively form a first level of arbitration, and wherein the page scheduler forms a second level of arbitration.

8. A digital television (DTV) receiver comprising:
   a memory;
   a plurality of buses;
   a central processing unit, a display controller and a video decoder, each coupled to one of the plurality of buses; and
   a memory controller, coupled to the memory and the plurality of buses, to receive incoming memory access requests for accessing the memory; to classify the incoming memory access requests into a categorization that distinguishes between low-latency memory access requests, high-bandwidth real-time memory access requests and high-bandwidth batch memory access requests; to employ at least one competition tree to sort the incoming memory access requests; and to prioritize accesses to the memory in response to the incoming memory access requests based on the sorting by the at least one competition tree for said categorization.

9. The DTV receiver of claim 8, wherein the plurality of buses comprise a first bus and a second bus; and
wherein the memory controller comprises:
a low-latency scheduler coupled to the first bus to schedule low-latency requests from low-latency clients;
a high-bandwidth client request scheduler coupled to the second bus to schedule high-bandwidth real-time requests from high-bandwidth real-time clients and to schedule high-bandwidth batch requests from high-bandwidth batch clients; and
a page scheduler, coupled to the low-latency scheduler and the high-bandwidth client request scheduler, to schedule memory access requests.

10. The DTV receiver of claim 9, wherein the high-bandwidth client request scheduler arbitrates requests from high-bandwidth real time clients and from high-bandwidth batch clients.

11. A method of providing access to a memory, the method comprising:
receiving from a plurality of clients a plurality of memory access requests, for accessing the memory;
classifying the incoming memory access requests into a categorization that distinguishes between low-latency memory access requests, high-bandwidth real-time memory access requests and high-bandwidth batch memory access requests;
employing at least one competition tree to sort the incoming memory access requests; and
prioritizing accesses to the memory in response to the incoming memory access requests based at least on the sorting by the at least one competition tree for said categorization.

12. A method for ordering memory access requests to a unified memory comprising:
receiving high-bandwidth memory access requests and low-latency memory access requests;
employing at least one competition tree to sort the high-bandwidth memory access requests;
arbitrating the high-bandwidth memory access requests to determine an order for fulfilling the high-bandwidth memory access requests based at least on the sorting by the at least one competition tree;
fulfilling the low-latency memory access requests; and
fulfilling the high-bandwidth memory access requests in the order arbitrated after fulfilling the low-latency memory access requests.

13. The method of claim 12, wherein arbitrating further comprises:
receiving the high-bandwidth memory access requests;
determining a type of the high-bandwidth memory access requests;
sorting the high-bandwidth memory access requests into several competition trees based on the type of the high-bandwidth memory access requests; and
determining a winning request for each of the several competition trees.

14. The method of claim 12, wherein fulfilling the low-latency memory access requests comprises:
assigning a priority order to the low-latency memory access requests; and
fulfilling the low-latency memory access requests according to the priority order.

15. The method of claim 14, wherein assigning a priority order comprises:
determining a priority number for each low-latency memory access request.

16. The method of claim 15, wherein determining a priority number comprises:
determining a binary number comprising several fields, wherein each of the fields is set to signify an event.

17. The method of claim 14, wherein assigning a priority order comprises:
assigning a programmable priority value to each low-latency request; and increasing the programmable priority value as the request ages.

18. The method of claim 14, further comprising:
scheduling the low-latency memory access requests based on the priority, and delaying the low-latency memory access requests so that the low-latency memory access requests are scheduled just-in-time.

19. The method of claim 12, further comprising:
interrupting the fulfilling of the low-latency memory access requests, wherein the fulfilling of the low-latency memory access requests includes fulfilling a queue of the low-latency memory access requests; and
fulfilling the high-bandwidth memory access requests before fulfilling the low-latency memory access requests when high-bandwidth clients making the high-bandwidth memory access requests are starved.

20. The method of claim 12, wherein fulfilling the low-latency memory access requests comprises:
interrupting the fulfilling the high-bandwidth memory access requests.

21. The method of claim 20, wherein interrupting the fulfilling of the high-bandwidth memory access requests comprises waiting until a current memory access request is fulfilled if an interrupting memory access request is attempting to access a same memory bank as the current memory access request.

* * * * *